Figure 4:
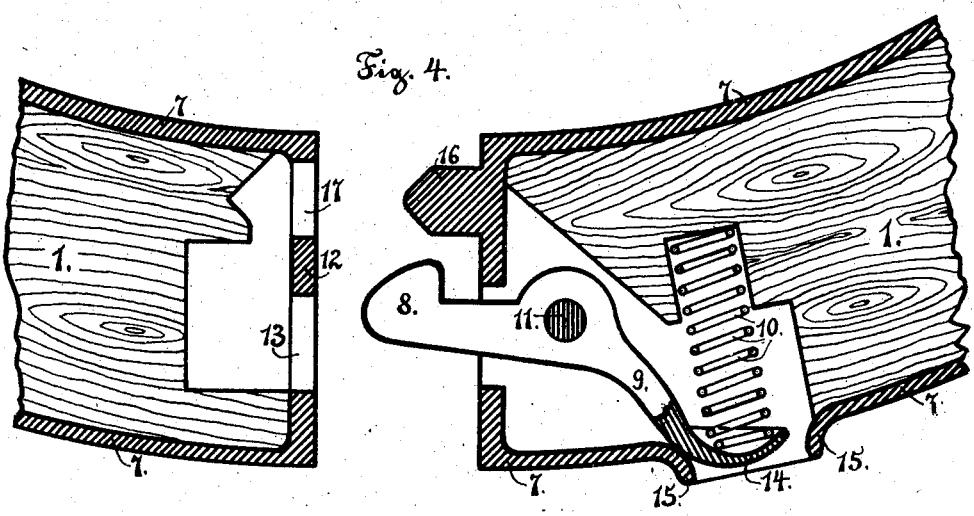

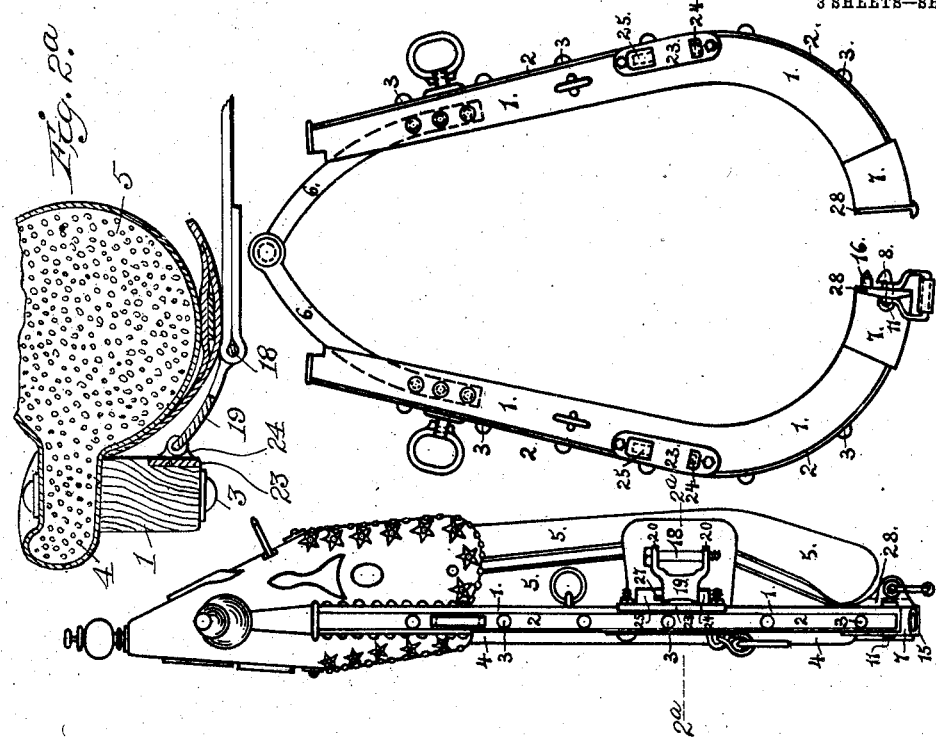

No. 790,579. PATENTED MAY 23, 1905.
F. A. KLAPPAUF, C. WEINZAEPFLEN & A. RIBER.
HORSE COLLAR.
APPLICATION FILED OCT. 14, 1903.

3 SHEETS—SHEET 2.

WITNESSES:   INVENTORS.
   F. A. Klappauf.
   Charles Weinzaepflen.
   Alphonse Riber.
By H. F. Wallmann.
ATTORNEY.

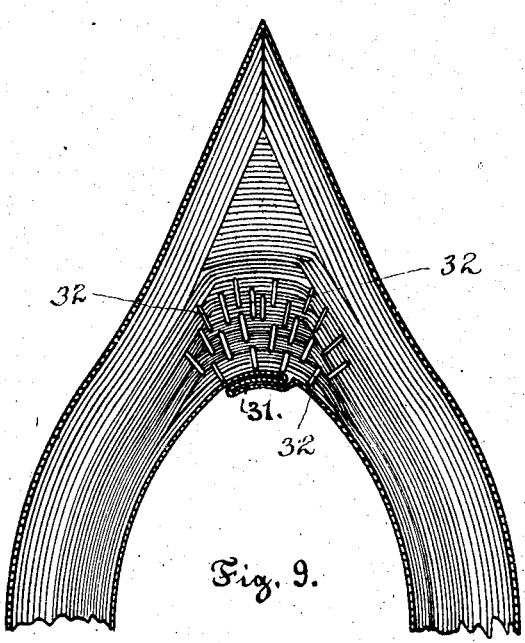
Fig. 9.
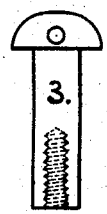
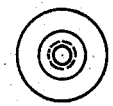
Fig. 10.
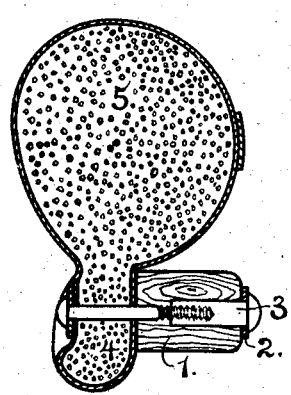
Fig. 8.

No. 790,579. Patented May 23, 1905.

UNITED STATES PATENT OFFICE.

FERDINAND ANTON KLAPPAUF, CHARLES WEINZAEPFLEN, AND ALPHONSE RIBER, OF CHICAGO, ILLINOIS.

HORSE-COLLAR.

SPECIFICATION forming part of Letters Patent No. 790,579, dated May 23, 1905.

Application filed October 14, 1903. Serial No. 177,035.

*To all whom it may concern:*

Be it known that we, FERDINAND ANTON KLAPPAUF, a citizen of the United States, and CHARLES WEINZAEPFLEN and ALPHONSE RI-
BER, subjects of the German Emperor, all residing at Chicago, in the county of Cook and State of Illinois, have invented a new and useful Horse-Collar, of which the following is a description, reference being had to the accompanying drawings, forming a part of this specification, in which corresponding numerals of reference in the different figures indicate like parts.

Our invention relates to horse-collars as are used for transmitting the power of a horse by means of a harness to a vehicle; and the objects of our improvements are, first, to facilitate of the collar being put on and being removed from the horse; second, to facilitate the connection and disconnection of the collar, respectively, to and from the traces, and, third, to so construct the collar in its details as to form a perfect cushion against the shoulders of the horse in taking up the strain from the traces and at the same time to form a frame rigid and solid enough as not to get out of shape by the strain from the traces and to protect the horse against being hurt by any undue pressure and friction as might result from such strain in the case that the collar would get out of its proper shape. We attain these objects, first, by providing between the two symmetrical halves of the collar a hinge in its upper and a coupling device of peculiar construction in its lower part; second, by providing the collar with mechanisms of peculiar construction for connecting and disconnecting the collar, respectively, to and from the traces, which mechanisms will hereinafter be called "drafts;" third, by rigidly connecting the solid frame of the collar, which frame will hereinafter be called the "hames," by means of the "rim" to the cushion proper, which cushion will hereinafter be called the "collar-body;" fourth, by tying the material forming the cushion of one of the two symmetrical halves in a peculiar way to the material forming the cushion in the other of the two symmetrical halves of
the collar, and, fifth, by connecting the drafts in such a way to the hames as to decrease the tendency of the strain from the traces to change the shape of the collar.

Figures 5, 6, 7:
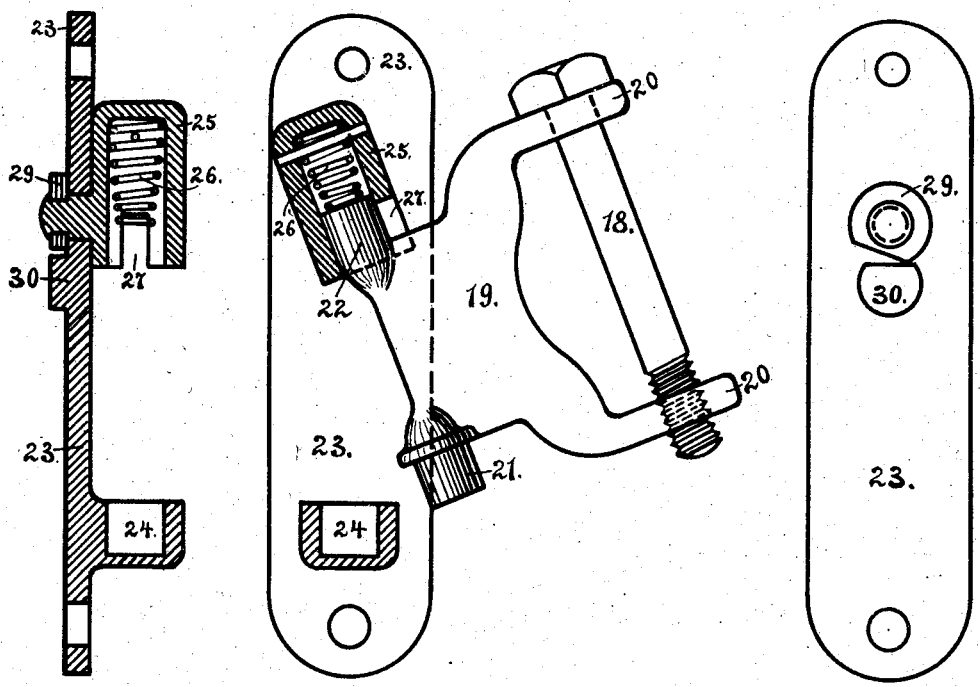

Referring to the drawings, Figure 1 is a front view of the horse-collar. Fig. 2 is a side view. Fig. 2$^a$ is a horizontal section on the line 2$^a$ 2$^a$ of Fig. 2. Fig. 3 is a rear view of the hames, the coupling device at the lower end being disengaged. Fig. 4 is a vertical section through the coupling device. Fig. 5 is a vertical section through one of the drafts. Fig. 6 is another vertical section through one of the drafts at right angles to Fig. 5, the swivel-socket being turned sidewise, this figure explaining the method of connecting and disconnecting the traces, respectively, to and from the collar. Fig. 7 is a rear view of one of the drafts. Fig. 8 is a horizontal section through one-half of the collar at the line $m$ $n$ of Fig. 1. Fig. 9 is a vertical section through a part of the top of the collar, explaining the mode of connecting the material of the cushion of one half of the collar to that of the other half. Fig. 10 is a bolt used for connecting the hames to the rim.

1 1 are the hames, preferably made of wood, reinforced at the outside by iron bands 2 2. Bolts 3 3 connect the hames to the rims 4 4, which are preferably made in one piece with the collar-bodies 5 5. The outside of rims and collar-bodies preferably consist of leather filled with a suitable elastic material, as straw, wool, hair, &c.

6 6 are the braces of a hinge of any suitable well-known construction, preferably made of wrought-iron. The braces 6 6 are rigidly connected in any suitable manner to the upper part of the hames 1 1.

The lower end of each of the hames is inclosed in a kind of a metal casing 7 7, preferably of brass. These casings 7 7, together with the hook 8, lever 9, spring 10, and bolt 11, constitute the coupling device. The hook 8 and the lever 9, being pivoted on the bolt 11, are preferably forged in one piece. Fig. 4 shows the coupling device disengaged or unlocked. By moving the two casings 7 7 toward each other the hook 8 strikes with its inclined plane against the part 12, bends down into the hole 13, thereby lifting the lever 9 and compressing the spring 10. As soon as the two casings are close to each other the hook 8 has advanced so far into the hole 13 as to bring its inclined plane out of contact with the part 12. The spring 10 then presses down the lever 9, thereby lifting the hook 8. The coupling device is now engaged or locked. By pressing a thumb against the bent part 14 of the lever 9 and by simultaneously pulling the two hames apart the coupling device becomes unlocked again. In order to prevent the coupling device becoming unlocked by accident, the bent part 14 of the lever 9 is protected by a projection 15, forming a recess for said bent part 14. This recess and hole inclosed by the circular projection 15 is large enough as to allow the lever 9, hook 8, and spring 10 being removed through the same out of the casing 7 after the bolt 11 has been taken from its place. Naturally hook, lever, and spring can also be brought back into the position shown by entering through the same recess. This circumstance, together with the fact that the spiral spring 10 rests directly in the cavity formed by the bent part 14 of the lever, makes the coupling device very simple and reliable. In order to furthermore secure the relative position of the hames to each other, one of the casings 7 7 is provided with a projection 16, fitting into a corresponding hole 17 in the other casing.

Each of the drafts consists of the following parts: a bolt 18, to be connected in any well-known suitable manner to one of the traces; a movable bracket 19, provided with arms 20 20 for supporting the bolt 18 and with pegs 21 and 22, allowing of a swinging motion of the movable bracket 19; a stationary bracket 23, provided with one stationary socket 24, fitting to the peg 21, and with one swivel-socket 25, fitting to the peg 22, both sockets supporting the movable bracket 19, and a spiral spring 26 for pressing the peg 21 into the stationary socket 24. The stationary brackets 23 are fastened, preferably by means of bolts or screws, to the back of the hames 1 1 instead of, as is usually done, to the sides of the hames. It will be understood that by attaching the traces as close as is practically possible to the center of the hames the tendency of such strain to change the shape of the collar is reduced.

In order to disconnect one of the traces from the collar, the movable bracket 19 is turned sidewise out of the position shown in Fig. 2 until it corresponds with the position of a slot 27 in the swivel-socket 25, when it is lifted up, thereby compressing the spring 26 until the peg 21 is lifted out of the stationary socket 24. Then the swivel-socket 25 is turned sidewise and the peg 22 pulled out of the same, as is clearly understood from Fig. 6. It is also seen that the movable bracket 19 can only be disconnected from the collar after it has been turned in a certain direction at right angles to the direction of the traces. It seems therefore to be almost impossible that one of the traces could become disconnected from the collar by accident.

Fig. 7 shows a projection 30, preventing the swivel-socket 25 and its pin with plate 29 from swinging more than is necessary for removing the peg 22 out of the socket 25.

In Fig. 9 it is assumed that the collar-body consists of straw inclosed by leather. At the top of the collar the straw from both symmetrical halves of the collar is partly bent in a horizontal direction and tied together by ties 32 in layers passing each other, the other part of the straw being placed upward for forming a point, provided that such point is desired as a kind of ornament. If this is not the case, then all of the straw may be bent in a horizontal direction and tied together as before, or a part of it may be cut away.

The bolt shown in Fig. 10 affords the advantage that no screw or nut is visible at the outside of the hames or rims.

The leather at the top of the opening for the horse-neck is folded and overlapped, as is indicated at 31 in Fig. 1, in order to prevent its being torn whenever the lower parts of the two halves of the collar are spread apart.

The coupling device is provided with two ribs 28 28, resting against each other whenever said device is locked and reinforcing the collar against any strain tending to change its shape.

It will be observed that a feature of special importance lies in fastening the draft devices to the rear flat sides of the hames. This results in greater endurance to the hames and the collar in that all twisting and distorting strains are avoided, the pull being directly backward. This also permits the traces to be attached to the hames closer to the shoulders of the animal, so that the pulling strain will bring the pressure directly on the front of the collar, thereby insuring the utilization of the full value of the elasticity of the collar, whereas with the ordinary manner of attaching the traces to the hames the strain is brought more on the outer sides of the collar-sections and results, therefore, in subjecting the animal to an undesirable and unnecessary strain.

We claim—

1. A horse-collar having hames rigidly connected to its rims, said hames being provided with draft devices fastened to the backs of the hames.

2. A horse-collar consisting of a casing and a stuffing of straw running longitudinally of the casing, the straw in the opposite halves of the collar being bent inward at the top of the collar and overlapped at the crotch or neck portion, these overlapped parts being tied together, whereby the collar may be flexed or bent at the crotch.

3. In a horse-collar, the combination of collar-sections each of which is provided with a forwardly-extending rim, a hame attached to the outer side of each rim, and a draft device attached to the rear side of each hame and extending directly rearward and lying close to the outer side of the collar, substantially as set forth.

FERDINAND ANTON KLAPPAUF.
CHARLES WEINZAEPFLEN.
ALPHONSE RIBER.

Witnesses:
HENRY EULBERG,
J. E. MURBACH.